US009602744B2

(12) United States Patent
Hall et al.

(10) Patent No.: US 9,602,744 B2
(45) Date of Patent: Mar. 21, 2017

(54) METHOD OF DETECTOR GAIN AND OFFSET LEVEL ESTIMATION BY MEANS OF A VARIABLE APERTURE TRANSMISSION MECHANISM

(71) Applicant: The United States of America, as represented by the Secretary of the Army, Washington, DC (US)

(72) Inventors: John M. Hall, Stafford, VA (US); Christina X. Bourgeois, Alexandria, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 3 days.

(21) Appl. No.: 14/826,608

(22) Filed: Aug. 14, 2015

(65) Prior Publication Data

US 2017/0048473 A1 Feb. 16, 2017

(51) Int. Cl.
H04N 5/365 (2011.01)
H04N 5/378 (2011.01)

(52) U.S. Cl.
CPC ........... *H04N 5/3653* (2013.01); *H04N 5/378* (2013.01)

(58) Field of Classification Search
CPC ...... H04N 5/3653; H04N 5/378; H04N 5/238; H04N 5/243; H04N 5/235
See application file for complete search history.

(56) References Cited

U.S. PATENT DOCUMENTS

| | | | |
|---|---|---|---|
| 5,047,861 A * | 9/1991 | Houchin | H04N 5/3655 348/247 |
| 5,343,040 A | 8/1994 | Wiese et al. | |
| 7,304,297 B1 | 12/2007 | King et al. | |
| 8,497,479 B1 * | 7/2013 | Garman | G01J 5/06 250/352 |
| 8,760,509 B2 | 6/2014 | Schmidt et al. | |
| 8,872,111 B2 | 10/2014 | Burkland | |
| 2005/0231627 A1 | 10/2005 | Murphy et al. | |

OTHER PUBLICATIONS

P. Fillon, A. Combette, P. Tribolet, "Cooled IR detectors calibration analysis and optimization," In Proc. SPIE Orlando, 2005, [5784-42].

A. Kumar, S. Sarkar, and R.P. Agarwal, "Fixed pattern noise correction and implementation for infrared focal plane array based staring system using scene statistics," International Journal of Imaging Science and Engineering (IJISE), vol. 1, No. 1, Jan. 2007. [ISSN: 19349955].

(Continued)

*Primary Examiner* — Nicholas Giles
(74) *Attorney, Agent, or Firm* — Richard J. Kim (57) ABSTRACT

The basis of the invention is an apparatus and a process by which a variable aperture stop mechanism coupled with imaging optics and detector processing electronics achieves measurements of detector pixel gain and level offsets without temporarily blocking the scene from the detector, and without the addition of any other exterior calibration equipment.

16 Claims, 8 Drawing Sheets

(56) References Cited

OTHER PUBLICATIONS

K.G. Lesueur, E. Jovanov, and A. Milenkovic, "Lookup table based real-time non-uniformity correct of infrared scene projectors," Proc. of the 12th Annual DoD High Performance Computing Modernization User Group Conference, Austin, TX, Jun. 2002.
S. N. Torres, M. M. Hayat, "Kalman filtering for adaptive nonuniformity correction in infrared focal-plane arrays." Journal of Optical Society of America. A Opt Image Sci Vis, vol. 30, No. 3, Mar. 2003, [470-80].
D. A. Scribner, K. A. Sarkady, J. T. Caulfield, M. R. Kruer, G. Katz, C. J. Gridley, C. Herman, "Nonuniformity correction for staring IR focal plane arrays using scene-based techniques," in Proc. SPIE 1308, Infrared Detectors and Focal Plane Arrays, 224, Sep. 1, 1990.
X. Chen, Y. Li, C. Di, X. Wang, Y. Cao, "A novel non-uniformity correction method based on ROIC," In Proc. SPIE 8002, MIPPR 2011: Multispectral Image Acquisition, Processing, and Analysis, 80020O, Dec. 8, 2011.
Gat et al., "Variable Cold Stop for Matching IR Cameras to Multiple f-number Optics**," SPIE Proceedings 6542, Infrared technology and Applications, XXXIII, Defense & Security Symposium, Orlando, FL, 2007.
Milton et al., "Influence of nonuniformity on infrared focal plane array perfromance," Optical Engineering Sep.-Oct. 1985, vol. 24, No. 5, pp. 855-862.
King et al., "3rd-generation MW/LWIR sensor engine for advanced tactical systems," Proc. SPIE 6940, Infrared Technology and Applications XXXIV, 69402R (Apr. 22, 2008); doi:10.1117/12.786620.
R. Olbrycht and B. Wiecek, "New approach to thermal drift correction and gain determination in microbolometer thermal cameras," 12th Quantitative InfraRed Thermography Conference, QIRT 2014, Jul. 7-11, 2014, Bordeaux, France.

* cited by examiner

METHOD OF DETECTOR GAIN AND OFFSET LEVEL ESTIMATION BY MEANS OF A VARIABLE APERTURE TRANSMISSION MECHANISM

GOVERNMENT INTEREST

The invention described herein may be manufactured, used, sold, imported, and/or licensed by or for the Government of the United States of America.

FIELD OF THE INVENTION

This invention is applicable to the field of electro-optical imaging sensors and the calibration thereof, particularly in regards to the non-uniformity correction process critical inputs of detector element gain and level offset parameters.

BACKGROUND OF THE INVENTION

Two-dimensional infrared photo-detectors require a normalization process to remove random offsets and gain differentials between the individual pixels in order that the image presented to the user is free of detector noise. The "level offsets" are the pixel outputs when there is no incident flux striking the detector pixels. The "gain" is the relative response of output signal versus input signal. For an optical detector system, a typical detector output is a voltage or current level, and the input signal is the photon flux from the scene. The process of normalizing both the gain and level offset detector pixel-to-pixel variation is known as non-uniformity correction, sometimes abbreviated as "NUC". This process is particularly important for detectors made of HgCdTe (mercury-cadmium-telluride) which is notorious for having significant levels of pixel non-uniformity despite the best manufacturing processes. A typical mathematical relation for the NUC process is as follows:

(Detector Pixel Output Signal)=(Gain)*(Input Signal)+(Offset)

This has exactly the same nature as the familiar linear equation, $y=mx+b$ where y is the output, m is the gain slope, x is the input signal, and b is the offset. The NUC process depends on accurately determining the absolute value x for any given output y by means of knowing the precise values of m and b. Detector devices are typically designed to produce a constant gain function, but it is certainly possible that the same process will work with polynomial or non-linear functions. In practice, it may also be found that these parameters are also functions of ambient temperatures, device ageing, and internal electronic settings.

The most direct and accurate prior art method of the NUC process requires that one or more mechanical structures of uniform spectral radiance be inserted in front of the detector array to block out the scene and thus ensure that each pixel is receiving the same incident flux. The pixel values can then be offset accordingly for that given flux level. Advanced systems may further include either two separate blocking structures of different apparent temperatures, or perhaps one structure with a variable temperature to adjust the photon flux output. Then by comparing the responses over two or more flux levels, the pixel gains can also be normalized. Devices have been specifically manufactured for this method. Specifically, a Thermal Reference Source (TRS) device consists of a smooth surface with a temperature stabilized control circuit which feeds back to the system electronics the value of the infrared photon flux by means of Planck's blackbody radiation laws. An example of a commercially available TRS product is the Model ST3821, produced by II-VI Marlow of Dallas, Tex. In order for the sensor to periodically see the TRS, a moving mirror and possibly one or more imaging lenses are also required to properly illuminate the focal plane with the TRS output. All of these materials are relatively expensive and require significant labor costs for installation and verification.

Another suggested NUC process is to vary the bias voltage of the sensor Read-Out Integrated Circuit (ROIC) in order to calculate gain and level coefficients. In this method, a shutter is used to provide uniform irradiance onto the detector array. Then, manipulating the same linear equation but considering the known bias voltage in the gain term, the gain and offset terms are calculated based on the average response of the detectors as the "expected" value. See, X. Chen, Y. Li, C. Di, X. Wang, Y. Cao, "A novel non-uniformity correction method based on ROIC," In Proc. SPIE 8002, MIPPR 2011: Multispectral Image Acquisition, Processing, and Analysis, 80020O, Dec. 8, 2011, incorporated herein by reference. This method, while effective, may reduce the dynamic range of a scene as it averages the signal across the pixels from the uniform shutter. This may not account for other optical effects such as cosine to the fourth loss across the scene. This process also has the significant disadvantage that one or more frames of imagery must be diverted from the scenery to the shutter surface.

Many attempts have been made to perform software-only based NUC processes with varying degrees of success. The most successful software prior-art technique is known as "scene-based NUC", wherein software analysis of several successive frames of data performs statistical models to predict the pixel gain and offset values. Typically this approach relies on a great deal of laboratory or factory-level calibration of the detector elements for use as look-up tables when used in the field. This approach is highly desirable because it does not require any interruption of the video stream, which is a requirement for tracking or guidance of fast objects such as missiles and jet aircraft. Scene-based techniques certainly do improve the quality of the imagery when the process iterates over several hundred frame analysis sequences, but statistical errors always result from imperfect sampling, limited processing times, and variations in the scene dynamics, and hence this approach has yet to compare with calibration by hardware methods. What is needed is a means of providing gain and offset coefficients to the NUC process which have the accuracy of a hardware calibration, but do not require interrupting the video images of the scenery which the sensor is intended to view.

SUMMARY OF THE INVENTION

In one aspect, an exemplary non-uniformity correction (NUC) method is disclosed which combines the accuracy of a hardware-based system with the passive, non-interference benefits of a software-based approach. The disclosed NUC process accounts for real-world operating environments and can be affordable in terms of limiting the number of calibration hardware which needs to be added to a given sensor system.

In another aspect, exemplary apparatus and processes are disclosed by which various variable aperture transmission mechanisms are used to generate the detector gain and offset parameters without temporarily blocking the scene from the detector, and without the addition of any other exterior calibration equipment. The output of this process may be used to directly correct output video, or it may be then used to simplify subsequent down-stream image processing.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Before entering into the detailed description of the various exemplary embodiments and various aspects of the present invention, the theory of the present invention will be explained based on a generalized structural description of an exemplary apparatus hereinafter.

Figure 1:
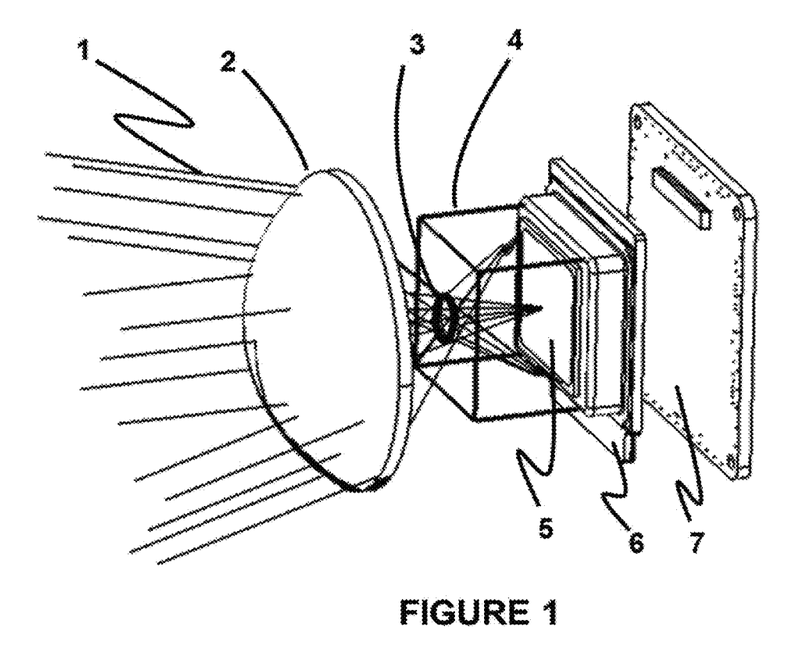
FIG. 1 shows an exemplary apparatus based on a variable aperture transmission mechanism for detector gain and offset level estimation.
Figure 4:
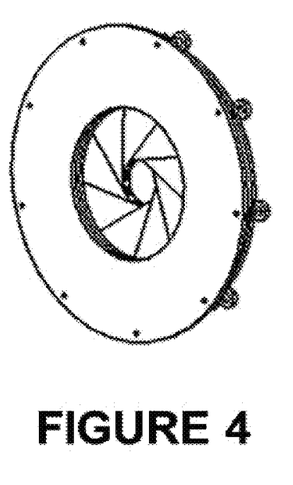
FIG. 4 illustrates an exemplary mechanical iris system, which is one example of a variable aperture transmission mechanism.

An exemplary apparatus based on a variable aperture transmission mechanism for detector gain and offset level estimation is best described by referencing FIG. 1 per the following discussion. Light rays 1 from the scenery are imaged by system optics 2 through an aperture stop 3 and onto a detector component 5. The light rays 1 may be of any wavelength in the optical spectrum, but is generally considered to be between 0.40 and 14.0 microns. The optical system 2 may contain any of a wide variety of lens, mirror, or diffractive structures, so long as it has focal properties and it images the light rays 1 through a limiting aperture stop 3. The aperture stop 3 of various embodiments contains a device which has the ability to vary the amount of light which passes through in a controllable and repeatable way within a short period of time. It may achieve this effect by a variety of means, including, but not limited to, mechanical iris actuators, moveable attenuation filters, and other electro-optical techniques known in the art such as a liquid crystal shutter device or a non-linear optical material. A common embodiment of a mechanical system such as an iris is shown in FIG. 4. The speed with which the transmission function change is completed must be fast enough so that the scene content does not change significantly between measurements, but slow enough that the detector frame rate can capture data at a known aperture position. For example, many video systems run at frame rates of 60 Hz, or in other words, the data frame of video is captured every $\frac{1}{60}$ second, in order to present smooth motion video to human observers. The aperture change must therefore occur within a small integer multiple of the system frame time. Returning now to FIG. 1, the aperture stop 3 can be contained within a cavity structure 4 which has an otherwise uniform radiance as witnessed by the detector 5. For example, in the case of a cryogenically cooled sensor system, the cavity structure 4 may be a vacuum dewar. In the case of a visible wavelength system, the cavity structure 4 may be a simple uniformly blackened enclosure. The detector component 5 may consist of one or more photo-sensitive pixel elements. In the case of multiple detector elements, they are typically arranged in a grid array format and are typically referred to as a "focal plane array". The detector elements convert the incident photon energy from the light rays 1 into an electrical signal which varies as the intensity of the photons which are focused onto the detector element pixel. The electrical signal is typically "read out" as either a voltage or current change by the detector electronics assembly 6 as is common in the art. The detector pixels are thus captured by the detector electronics assembly 6 and fed into the signal processor electronics 7 for data manipulation and eventual output of a video signal or other displayable output. In some recent photo-detector system developments, the functions of 6 and 7 can be merged into a single processor device.

Figure 2:
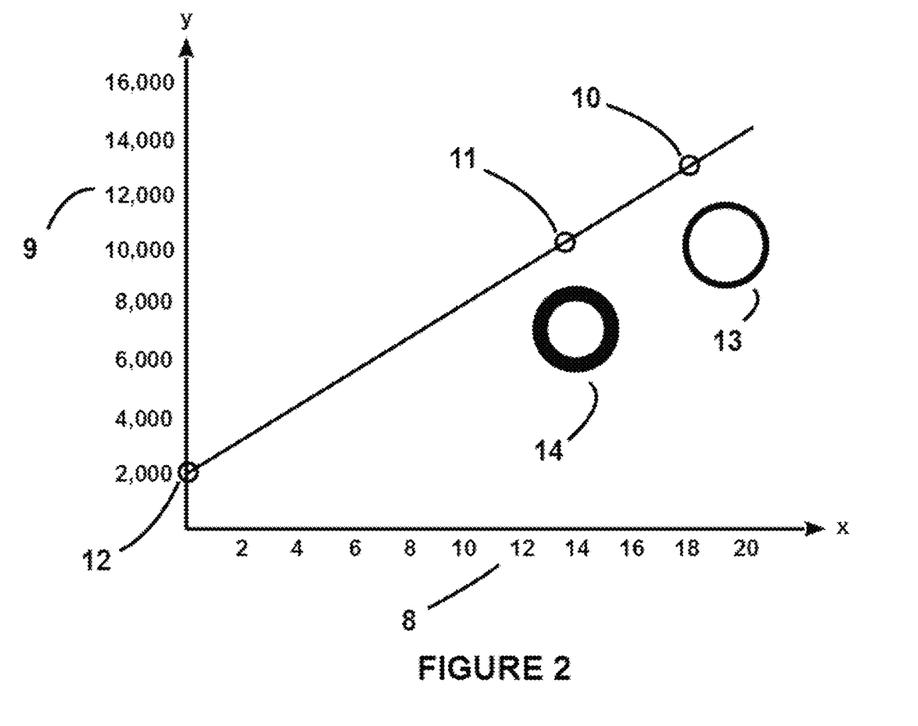
FIG. 2 is a graphic representation of exemplary output data from each pixel, where the x-axis corresponds to the relative intensity of incoming light ray photon flux, and the y-axis is a parameter of the digital number value associated with the pixel electronic signal output.

Output non-uniformities are caused by static and dynamic errors within each of the optics 1, detector enclosure 4, the detector 5, and the readout circuits 6. With such an exemplary apparatus generally shown by FIG. 1, a sequence of events occurs which results in the generation of detector pixel gain and offset values which can then be used by the system processor 7 to achieve non-uniformity correction as is known in the art. See, e.g., incorporated above by reference. See, also, D. A. Scribner, K. A. Sarkady, J. T. Caulfield, M. R. Kruer, G. Katz, C. J. Gridley, C. Herman, "Nonuniformity correction for staring IR focal plane arrays using scene-based techniques," in Proc. SPIE 1308, Infrared Detectors and Focal Plane Arrays, 224, Sep. 1, 1990, incorporated herein by reference. A working model of the method of the invention may be best described by referencing FIG. 2. The output data from each pixel may be visualized in graphic format, where the x-axis 8 corresponds to the relative intensity of incoming light ray 1 photon flux, and the y-axis 9 is a parameter of the digital number value associated with the pixel electronic signal output. In a typical 14-bit digitized system example, the detector pixel outputs will be assigned digital number values from 0 to $2^{14}-1$, namely 0 to 16,383. This type of plot may be referred to as a "response curve" for the system. When the aperture stop 3 is at its maximum transmission position, a pixel data value is read out and assigned a numerical value 10. Illustration example 13 indicates that an example iris aperture stop 3 is fully open. In a relatively short amount of time, the aperture transmission is actuated to attenuate a certain percentage of light radiation as indicated by illustration 14, and another pixel value measurement 11 is recorded by the system electronics 7. This results in two data captures of the same position in the scenery, but the second point is captured with a reduced aperture by a known percentage amount, which in turn scales the photon flux intensity value on the x-axis 8 by the same known amount. If the detector has multiple pixel elements, this process occurs for each pixel within the video frame. Once at least two points are thus recorded, the gain and level values for each pixel can be calculated using linear equations as follows where $(X_1, Y_1)$ are the coordinate values of measurement point 10 and $(X_2, Y_2)$ are the coordinate values of measurement point 11:

$$\text{Gain} = (Y_1 - Y_2)/(X_1 - X_2)$$

$$\text{Offset} = Y_1 - (\text{Gain})*(X_1) = Y_2 - (\text{Gain})*(X_2)$$

Figure 3:
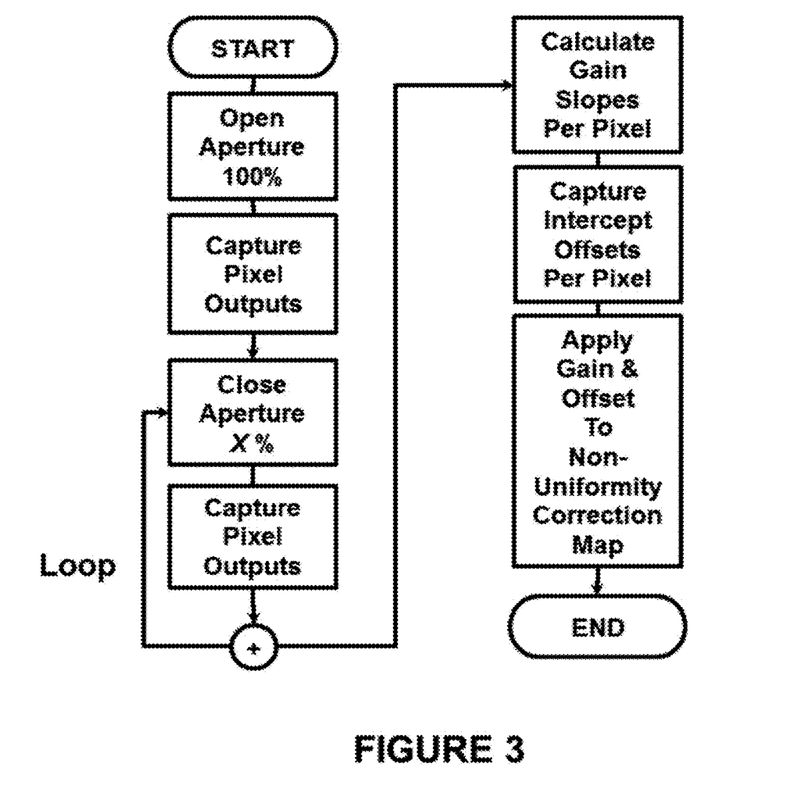
FIG. 3 shows a flow chart of an exemplary sequence of steps for repeated measurements at different aperture stop area obscurations.

It can be seen from the FIG. 2 and the equations above that the Gain value is the slope between the measurement points 10 and 11, and the Offset is the y-intercept as shown by point 12. It is also possible for the same results to occur when multiple measurements are taken at more than two positions of the aperture stop 3. In these cases, statistical estimation known in the art can be used to improve the accuracy of the measurements. Ultimately, the reporting of gain and offset values is exactly the same. FIG. 3 shows a flow chart of the sequence of events and addresses the option for a "loop" of repeated measurements at different aperture stop 3 area percentages of obscuration. Regardless of the loop, the Gain and Offset values are fed into the non-uniformity correction process as known in the art.

Figure 5:
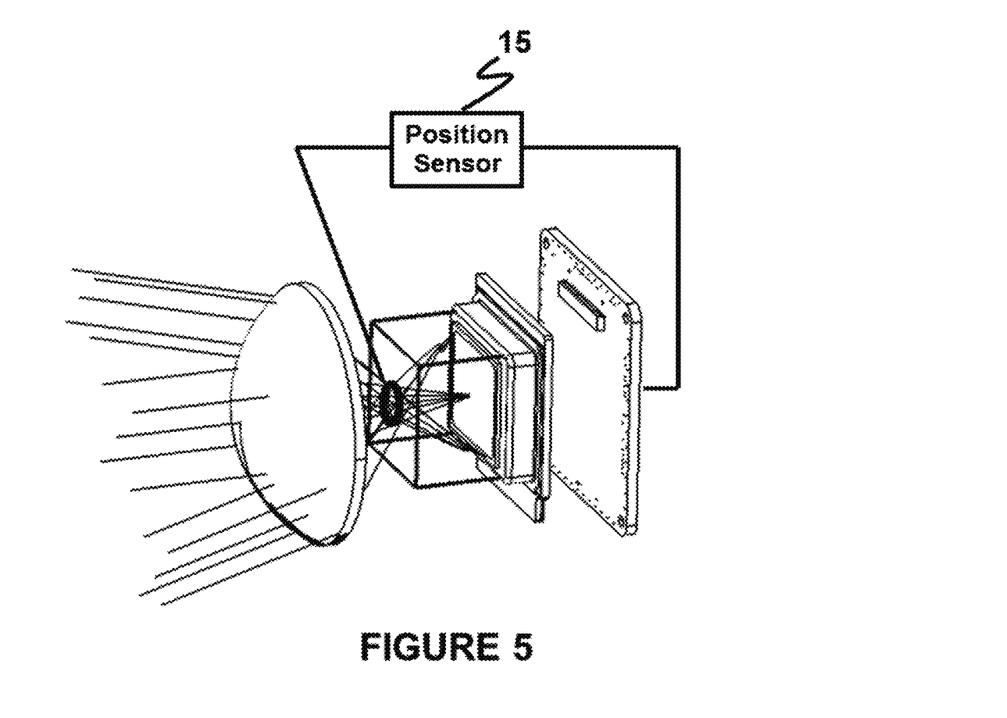
FIG. 5 illustrates an alternate variable aperture transmission mechanism incorporating a position feedback mechanism.

The accuracy and change speed of the variable aperture transmission 3 are important. Accuracy is required to know the precise percentage of transmission reduction, as this affects the subsequent calculations directly. Current variable aperture technology offers a variety of ways in which the accuracy can be maintained to an acceptable level. One method is to design an iris mechanism of 3 with a fixed "hard stop", whereupon the aperture mechanisms slam into either position defined by a hard material such as steel. This approach is adequate if the sensor system operates nominally at a single nominal stop setting. But for systems which need to operate over multiple settings, the hard stops must be configured to change with each position, and this may be difficult to implement. A solution in this case would be to add a position feedback mechanism 15 as shown in FIG. 5. The feedback mechanism 15 may be comprised of an optical encoder, linear variable displacement transducer (LVDT), a potentiometer, or any such position measurement device known in the art. Commercial examples of an LVDT include model #75-00-050 from Sentech, Inc. It measures the position of the aperture 3 and outputs a signal to the system processor 7 which enables the computations to know the exact relative amount of open aperture at the time of a measurement, without the need for driving the aperture mechanism against hard stops. This approach likewise improves the speed of the area change because it is no longer necessary to wait until the aperture reaches a particular single position. A similar condition can be obtained with a rotating filter wheel element which serves as the variable transmission function. In this case, the position sensor is used to feedback the exact position of the filter within the optical path, thus imparting knowledge of the transmission function at any point in time.

Specific alternative embodiments of the apparatus and a processing algorithm are now disclosed. Various exemplary embodiments of the apparatus for the invention include two major components, first an imaging sensor assembly, and second, a means of providing a temporary variable transmission function. The imaging sensor assembly is best based on the commercially available DRS Technologies' Zafiro™ HD sensor module. See, e.g., Zafiro™ by DRS Technologies, incorporated herein by reference (web link: http://www.drsinfrared.com/Products/ZafiroHD.aspx). This product includes a 1280×720 pixel staring array with 12 micron pitch which images light in the 3-5 micron spectral band. The product comes with a control electronics circuit board which converts the focal plane video into 14-bit digital signals and first adjusts the data for non-uniformity correction (NUC) and then compresses a video output according to digital standards such as CameraLink which is compatible with commercial display monitors and video recorders. The processor circuit card holds a programmable logic chip which allows upload of software/firmware which contains the video processing algorithms. The product also includes an integral dewar-cooler system which provides a cold-shield aperture stop which may be customized to meet host system optical requirements. The Zafiro sensor assembly fits within a 2.1×3.5×4.2 inch envelope.

Figure 6:
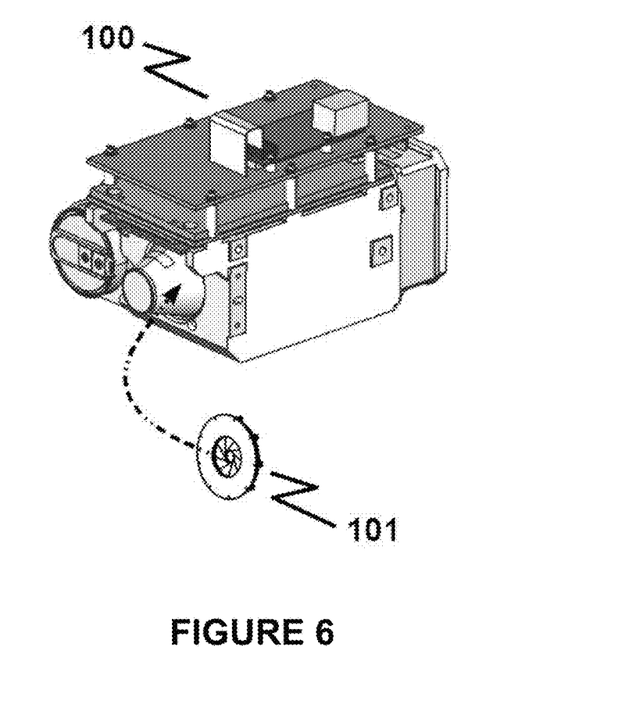
FIG. 6 shows a first exemplary imaging sensor assembly based on a cryogenic variable aperture stop serving the function of a variable aperture transmission mechanism for detector gain and offset level estimation.
Figure 7:
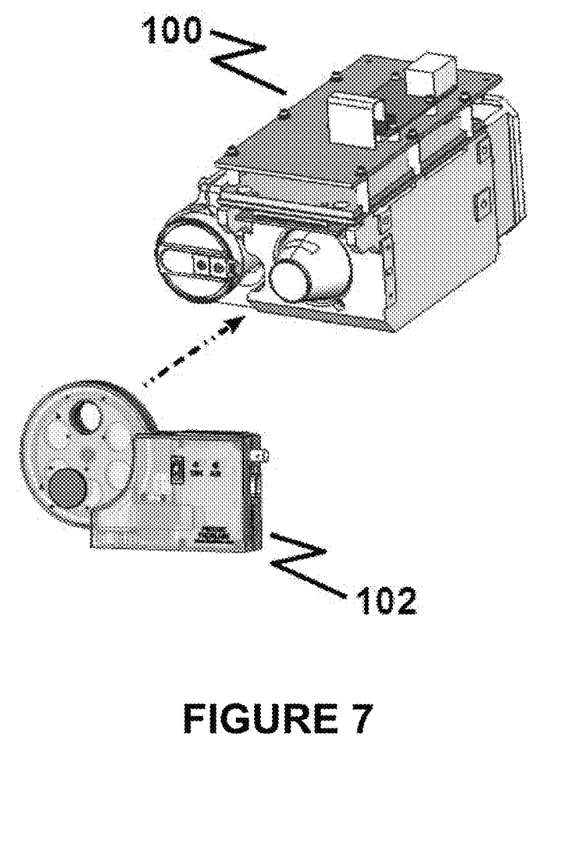
FIG. 7 shows a second exemplary imaging sensor assembly based on a moveable filter wheel serving the function of the variable aperture transmission mechanism for detector gain and offset level estimation.

There are two alternative best mode means of providing the variable aperture transmission depending on the desired integration cost. The first alternative best mode means is to replace the DRS standard aperture stop within the cryogenic dewar with a vacuum packaged, cryogenic variable aperture transmission mechanism such as the Opto-Knowledge Systems Inc. (OKSI) VariAp® device. FIG. 6 shows such an exemplary imaging sensor assembly 100 based on a cryogenic variable aperture transmission mechanism 101 for detector gain and offset level estimation. This device is a variation of an electronically controllable iris mechanism, and can be commanded via standard serial computer communications such as RS-232 or USB. The second alternative best mode means is a lower cost approach which achieves the same theory of operation, albeit with less fidelity due to self-emissions of the materials in the optical path, by means of inserting a neutral density optical filter in warm space just outside of the standard dewar window and thus very near the system cold-stop. FIG. 7 shows such an exemplary imaging sensor assembly 100 based on a moveable filter wheel mechanism 102 for detector gain and offset level estimation. In this case a moveable filter wheel mechanism such as the commercially available ThorLabs FW102C is appropriate, where at least one filter position has a "blank" filled with an anti-reflection coated transmitting element of a preferred low-absorption material such as Zinc Selenide (ZnSe), and at least one other position which holds a ZnSe substrate with a partially transmissive coating surface with a reduced transmission function that is characterized over the spectral bandpass of the sensor focal plane. See, e.g., Thorlabs FW102C—Six-Position Motorized Filter Wheel for 01" (025.4 mm) Optics, incorporated herein by reference (web link: http://www.thorlabs.com/thorProduct.cfm?partNumber=FW102C). For best results such that the sensor never incurs a blockage of incoming scenery, the filter wheel discrete positions can be modified such that the two positions are made of a single, continuous piece of ZnSe with only a change in the thin film coatings for each position. Thus, as the filter wheel rotates light from the scene is always passing through the aperture. This device can also be commanded via standard serial computer communications such as RS-232 or USB. The key aspect in either case is that an electronically switchable mechanism provides a predictable change in the aperture transmission function for light from the scenery reaching the detector pixel array.

Once either of the alternative means of establishing a controlled aperture transmission function has been established, the remaining aspects of the invention involve recording the data with specific aperture transmission function values, and then processing the data via an algorithm within a programmable logic device or computer to achieve the desired output information. The standard notation for mathematically modelling the output [V] of a two dimensional array of photo-responsive detectors is typically written in matrix form as follows:

$$[\phi]\cdot[R]+[S]=[V]$$

where [ϕ] is a matrix of incident flux values from the scene corresponding to each pixel, [R] is the gain response of each single pixel which is element-wise multiplied ("·") with each corresponding value in [ϕ], and [S] is the fixed offset amount per pixel which is added to the result to yield the actual measured pixel output value matrix [V]. In order to suppress noise and create a scene video image which is comprehensible by a human observer, it is desired to normalize the values of [R] and [S] for all pixels such that differences in pixel output video are due to the scene flux [ϕ] only. This is objective of the "non-uniformity correction" (NUC) process. See, e.g., X. Chen et al. and D. A. Scribner et al., both incorporated above by reference. The invention's novel modification to the prior art processing algorithms begins with the addition of a new term to represent the effects of the variable transmission function mechanism. This new matrix of aperture transmission values [A] is also element-wise multiplied by the incoming scene flux [co] ahead of the detector gain response, resulting in the following new generalized formulation:

$$[\phi]\cdot[A]\cdot[R]+[S]=[V]$$

During a NUC process, the variable aperture is commanded by the sensor processor circuit card and software/firmware to be in the full transmission position, with aperture transmission values now denoted as matrix $[A_1]$. Output data is read out from the detector pixel array and is and stored within the processor circuit card memory as a collective matrix of pixel values $[V_1]$. In a typical 14-bit digitized system, each detector pixel output value in matrix $[A_1]$ will have a digital number value from 0 to 16,383. Some of this value is due to the incident photon flux on the photodetector, and some of it is due to other noise factors which create an unwanted offset value. Then within a short period of time such that the scene contents have not changed substantially, the aperture area is either closed down to a known fraction of the normally full open position per best mode #1, or a filter with a known transmission function is inserted per best mode #2, to result in a second set of data collected with aperture transmission function $[A_2]$, and the array of pixel data is again collected and stored by the processor circuit card as a second matrix $[V_2]$. The ratio of aperture transmission functions, denoted as "a" hereafter and defined by the equation $[A_1]=\alpha[A_2]$, is a known value defined by the geometric and optical properties of the variable mechanism. The data set now allows generation of two sets of equations as follows:

$$[\phi]\cdot[A_1]\cdot[R]+[S]=[V_1]$$

$$[\phi]\cdot[A_2]\cdot[R]+[S]=[\phi]\cdot\alpha[A_1]\cdot[R]+[S]=[V_2]$$

The two equations can then be solved to directly determine the values of the offset matrix [S] as follows:

$$[V_1]-[V_2]=(1-\alpha)[\phi]\cdot[A_1]\cdot[R]$$

$$[\phi]\cdot[A_1]\cdot[R]=([V_1]-[V_2])/(1-\alpha).$$

Thus the final processing algorithm is obtained for offset [S] is as follows:

$$[S]=[V_1]-([V_1]-[V_2])/(1-\alpha).$$

Referring now to FIG. 2, the figure shows a graphic plot of this situation for a single detector pixel where measurement point A (10) corresponds to the full aperture transmission 13, and point B (11) corresponds to the 75% aperture transmission measurement (14). Notice that [S] is now directly solved by the known values in memory of $[V_1]$, $[V_2]$, and α which do not depend on knowing the actual scene flux contribution [ϕ]. It is also clear that the mathematic operations are simple subtractions and division by a scalar, which minimize the burden on the processing circuitry and firmware complexity. The values of matrix [S] are then passed on within the processor circuit card to the next stage in the software/firmware which performs the rest of the non-uniformity correction and final video output processes. The direct solution of [S] is of significant value because it relieves down-stream processing burdens by correcting errors induced to the sensor system by a dynamic environment. Such error sources may include imaging optics back-reflections and emissive noise sources within the sensor housings. These can all be corrected directly and on an independent pixel basis by means of the invention. In addition to providing a direct solution of offset via [S], the invention algorithm also outputs matrix values of individual pixel integrated responses [Z] per the following notation:

$$[Z]=[\phi]\cdot[A_1]\cdot[R]=([V_1]-[V_2])/(1-\alpha)$$

Or to write more simply, $$[Z]=[V_1]-[S].$$

The output values of [Z] contain the instantaneous gain responses of the pixels dependent on scene flux. They do not themselves provide a direct means of normalizing one pixels response against another, but they can now be used to correlate with any combination of predictive measures such as factory calibration lookup tables, field measurements against uniform sources, or scene-based gain estimates based on scene motion across a group of pixels as known in the prior art. Providing both the values of [S] and [Z] significantly reduces the downstream processing demand.

Figure 8:
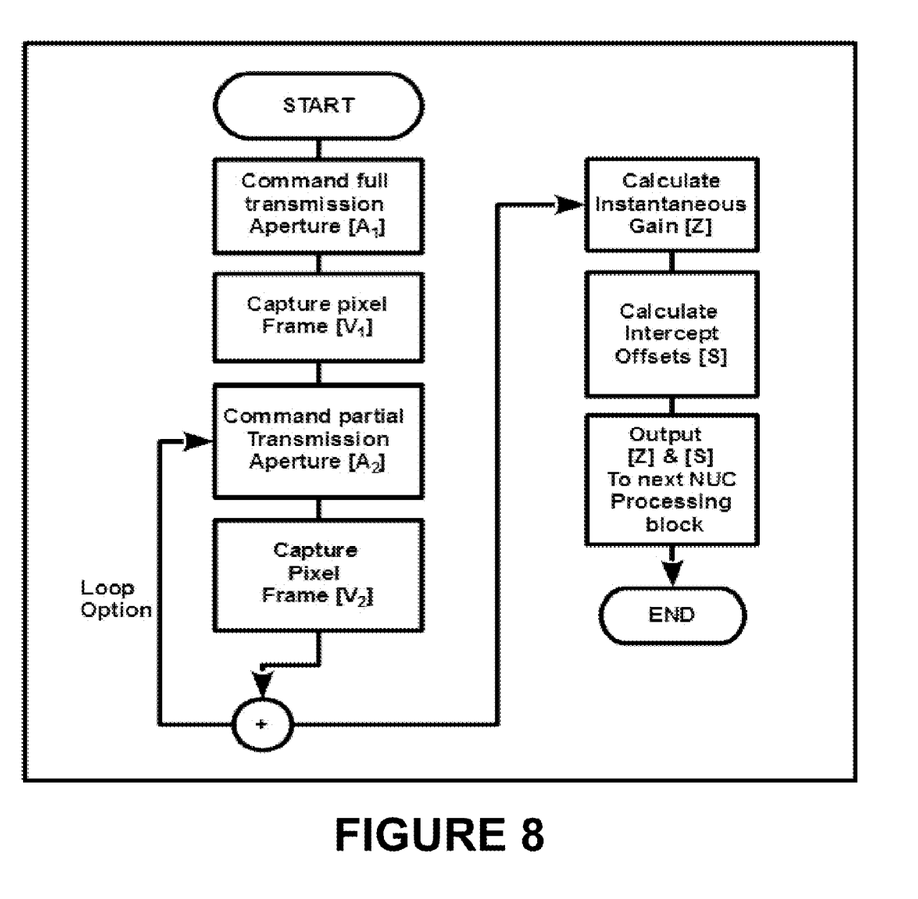
FIG. 8 shows an algorithmic flow chart of an exemplary sequence of detector pixel gain and level offsets computations at different aperture stop area obscurations without temporarily blocking the scene from the detector.

Accordingly, FIG. 8 shows an exemplary algorithmic flow chart of a method for detector gain and offset level estimation based on an exemplary imaging sensor assembly comprises the steps of:
  command full transmission aperture $[A_1]$;
  capture pixel frame $[V_1]$;
  command partial transmission aperture $[A_2]$;
  capture pixel frame $[V_2]$, wherein said capture pixel frame $[V_2]$ may be looped back to said command partial transmission aperture $[A_2]$;
  calculate instantaneous gain [Z];
  calculate intercept offsets [S]; and
  output instantaneous gain [Z] and intercept offsets [S] to next NUC processing block.

Such an exemplary sequence of detector pixel gain and level offsets computational steps based on an exemplary imaging sensor at variable aperture transmission achieves detector gain and offset level estimation without temporarily blocking the scene from the detector.

The accuracy of a and change speed of the variable aperture transmission between values of $[A_1]$ and $[A_2]$ is important. Current variable aperture technology using a VariAp® style mechanism per best mode means #1 offers a variety of ways in which the accuracy can be maintained to an acceptable level. One method is to design the aperture mechanism with a fixed "hard stop", whereupon the aperture mechanisms slam into either position defined by a hard material such as steel. This approach is adequate if the sensor system operates nominally at a single F# setting. But for systems which need to operate over multiple F#'s, the hard stops must be configured to change with each F# position and this may be problematic. An alternative approach in this case would be to characterize the repeatable motion of the aperture assembly such that it's position, and hence open area, during the total range of travel is synchronized to a computer clock. The clock feedback would then be associated with the data collection triggers, so that the precise aperture size is known at the time of the data frame collection. In either approach, the timing sequence is important in the sense that it is desired to collect two or more positions of data before any significant changes occur in the scenery. This value must be determined by the needs of the operational situation, but a case example showing a measure of practical applicability is provided below. The current experiments conducted by the US Army NVESD indicate that a cryogenically cooled variable aperture mechanism can achieve a change from 100% open to roughly a 39% open area in less than 0.85 seconds. Assuming the square of the linear radial mechanism travel time corresponds to aperture area percentage, this means that reaching a 75% area position might be accomplished in roughly 0.215 seconds. If the sensor is running at a 60 Hz frame rate (i.e., 16.667 msec per frame), then the NUC data could be collected within about 13 data frames.

It is obvious that many modifications and variations of the present invention are possible in light of the above teachings. It is therefore to be understood that within the scope of the appended claims, the invention may be practiced otherwise than as described.

What is claimed is:

1. An imaging sensor assembly based on a means of providing a temporary variable transmission function for detector gain and offset level estimation which does not block the sensor from viewing the scene, comprising:
    system optics to receive light rays from a scenery and focus said light rays;
    means of providing a temporary variable transmission function to achieve a variable transmission of light rays focused into a cavity structure;
    a detector component based on detector elements to image said variable transmission of light rays focused into a cavity structure, wherein a detector element converts incident light ray energy from said focused variable transmission of light rays into an electrical signal which varies in magnitude proportionally to a variable transmission amount of said light rays;
    a detector electronics assembly to read out the electrical signals as detector output values; and
    an electronic signal processor to receive the detector output values for data manipulation and output of a video signal or other displayable output, and into which is programmed an algorithm which takes at least two measurements of detector output values, each measurement corresponding to a different variable transmission amount of said light rays, and estimates pixel gain and offset therewith.

2. The imaging sensor assembly according to claim 1, wherein said light rays may be of any wavelength between 0.40 and 14.0 microns.

3. The imaging sensor assembly according to claim 1, wherein said system optics are comprised of at least one of a lens, mirror, or diffractive optical structure.

4. The imaging sensor assembly according to claim 1, wherein said means of providing a temporary variable transmission function is based on an aperture stop of a cavity structure, said aperture stop having a variable open passage into said cavity structure through which said light rays focus through, wherein said variable open passage has a variable area of open passage.

5. The imaging sensor assembly according to claim 1, wherein said means of providing a temporary variable transmission function to achieve a variable transmission into a cavity structure is based on a cryogenic dewar with a vacuum packaged cryogenic variable aperture mechanism.

6. The imaging sensor assembly according to claim 1, wherein said means of providing a temporary variable transmission function is connected to a position feedback mechanism for electronic signal processor computation of an exact relative amount of open aperture.

7. The imaging sensor assembly according to claim 1, wherein said means of providing a temporary variable transmission function is based on a moveable filter wheel mechanism having filter elements, wherein at least two of the filter elements is based on a common substrate material, each filter element having a respective thin film coating such that when the filter wheel transitions between the two filter elements, the light rays are not blocked during actuation of the filter wheel mechanism.

8. The imaging sensor assembly according to claim 1, wherein said means of providing a temporary variable transmission function is based on a variable neutral density optical filter in warm space.

9. A method for detector gain and offset level estimation based on the imaging sensor assembly according to claim 1, the method comprising the steps of:
    command full transmission aperture $A_1$;
    capture pixel frame $V_1$;
    command partial transmission aperture $A_2$;
    capture pixel frame $V_2$, wherein said capture pixel frame $V_2$ may be looped back to said command partial transmission aperture $A_2$;
    calculate instantaneous gain Z;
    calculate intercept offsets S; and
    output instantaneous gain Z and intercept offsets S.

10. The method for detector gain and offset level estimation according to claim 9, wherein said instantaneous gain Z and intercept offsets S are calculated as follows for non-uniformity correction processing:

$$S = V_1 - (V_1 - V_2)/(1-\alpha); \text{ and}$$

$$Z = (V_1 - V_2)/(1-\alpha),$$

wherein $\alpha$ is a ratio of aperture transmission functions.

11. A method for detector gain and offset level estimation based on a variable aperture stop mechanism, the method comprising the steps of:
    focusing light rays from a scenery incident on system optics;
    subjecting said focused light rays through a temporary variable transmission function with at least two differing amounts of transmission;
    imaging said focused light rays subjected through said temporary variable transmission function onto a detector component for each of said at least two differing amounts of transmission, wherein said detector component is based on at least one photo-sensitive pixel element for converting incident energy from said focused light rays into electrical signals;
    reading out said electrical signals as detector signal values for each of said at least two differing amounts of transmission using a detector electronics assembly; and
    feeding said detector signal values into an electronic signal processor for data manipulation, whereby the detector signal values corresponding to said at least two differing amounts of transmission are used to estimate gain and offset correction factors, and output a corrected video signal or other displayable output.

12. The method for detector gain and offset level estimation according to claim 11, wherein said temporary variable transmission function is based on a variable aperture stop of a cavity structure capable of varying its area of open passage.

13. The method for detector gain and offset level estimation according to claim 12, wherein in case of a cryogenically cooled sensor system, said cavity structure is a vacuum dewar.

14. The method for detector gain and offset level estimation according to claim 12, wherein in the case of a visible wavelength system, the cavity structure is a simple uniformly blackened enclosure.

15. The method for detector gain and offset level estimation according to claim 11, wherein data is manipulated to obtain gain and offset values as follows:
   when the temporary variable transmission function is at its maximum amount state for a first collection of detector signal values, a detector signal value is electronically read out and assigned a numerical value;
   when the temporary variable transmission function is in a reduced transmission state for a second collection of detector signal values, another detector signal value is electronically recorded, resulting in two data captures of a scenery for each pixel; and
   once at least two detector signal values are thus recorded, gain and level values for each pixel are calculated using linear equations for non-uniformity correction processing.

16. The method for detector gain and offset level estimation according to claim 15, the first collection of detector signal values corresponds to a normal imaging of a scene, and the second collection of detector signal values is captured with the reduced transmission state to scale intensity of light rays.

* * * * *